United States Patent [19]
Ketting

[11] Patent Number: 5,374,115
[45] Date of Patent: Dec. 20, 1994

[54] SEALING ARRANGEMENT FOR HINGES OF TRACK CHAINS

[75] Inventor: Michael Ketting, Ennepetal, Germany

[73] Assignee: Intertractor Aktiengesellschaft, Gevelsberg, Germany

[21] Appl. No.: 50,350

[22] PCT Filed: Nov. 11, 1991

[86] PCT No.: PCT/DE91/00883
§ 371 Date: Apr. 29, 1993
§ 102(e) Date: Apr. 29, 1993

[87] PCT Pub. No.: WO92/10389
PCT Pub. Date: Jun. 25, 1992

[30] Foreign Application Priority Data
Dec. 7, 1990 [DE] Germany .................. 4039095

[51] Int. Cl.[5] ...................... B62D 55/092
[52] U.S. Cl. ........................ 305/11; 305/14; 305/59
[58] Field of Search .......... 305/11, 14, 59, 58 R, 305/58 PC

[56] References Cited
U.S. PATENT DOCUMENTS

| | | | |
|---|---|---|---|
| 3,309,864 | 3/1967 | Arndt et al. | 305/59 X |
| 3,409,336 | 11/1968 | Dadds | 305/59 X |
| 3,958,836 | 5/1976 | Brown et al. | 305/58 PC X |
| 3,975,028 | 8/1976 | Satsumabayashi et al. | 305/11 X |
| 4,007,972 | 2/1977 | Baylor | 305/11 |

FOREIGN PATENT DOCUMENTS

| | | | |
|---|---|---|---|
| 1505861 | 11/1970 | Germany | 305/11 |
| 2244408 | 3/1974 | Germany | 305/11 |

*Primary Examiner*—Russell D. Stormer
*Attorney, Agent, or Firm*—Herbert Dubno

[57] ABSTRACT

Sealing arrangement including an elongated bolt formed with a unilaterally open bore, a bushing coaxial with the bolt and spaced radially outwardly therefrom to form an annular passage between the bolt and bushing, the bushing being integrally provided with opposite support end surfaces, a pair of outer chain link mounted on the bolt and the bushing and forming respective opposite spacers with the respective support surfaces of the bushing, each of the spacers being provided with respective lubricating channels formed in the bushing and communicating with the annular channel for conveying a lubricant from the channel into the spacers and a pair of annular seals each received in the respective spacer.

6 Claims, 3 Drawing Sheets

SEALING ARRANGEMENT FOR HINGES OF TRACK CHAINS

CROSS REFERENCE TO RELATED APPLICATIONS

This application is a national phase application corresponding to PCT/DE91/00883 filed Nov. 11, 1991 and based in turn, upon a German application P4039095.0 filed Dec. 7, 1990 under the International Convention.

FIELD OF THE INVENTION

The invention relates to a sealing arrangement for hinges of track chains wherein the hinge includes of a bolt and a bushing, the outer chain links are secured to the bolt and the inner chain links are secured to the bushing, whereby the bolt has a reservoir which can be filled with lubricant and is connected particularly via a cross-channel with the lubrication gap between the bushing and the bolt, the ends of which are sealed off with seals which are sealingly supported on the outer chain links on one side and on the bushing ends on the other side, whereby between each bushing end and each outer chain link a dimensionally stable support element is arranged.

BACKGROUND OF THE INVENTION

Such a sealing arrangement is known for instance from DE 31 27 104 C2. In the known sealing arrangement a support ring is arranged on the bolt with play between the bushing ends in a corresponding recess of the outer chain links, the actual elastic seal being supported on the outside of this ring. The seal rests with its sealing elements or wings on parts of the outer chain links on the one side and on the frontal side of the bushings on the other. In crawlers and the like where the track chains are subject to heavy loads it becomes necessary to lubricate the hinges, which, according to the state of the art, is done by feeding lubricants to a bushing/bolt combination, whereby due to a support ring—seal connection between the bushing, bolt and chain link a lubricant chamber is created in the link area. The drawback of the heretofore known solutions is that the vertical and horizontal forces generated in the hinges between the bushing-support ring-chain link, bushing-support ring-bolt or also between chain link-support ring-bolt produce inner stress, which can have disadvantageous effects on the sealing of the hinge. For instance, it can result in support ring breakages or in heavy wear of the sealing material.

The above-described sealing arrangement where the lubricants are introduced as flowable lubricants, as well as sealing arrangements where the lubricant reservoir is formed by the chamber wherein the seal is arranged, are known to the state of the art. Thereby grease or similar materials with low flowability are used. In this known construction the lubrication gap between the bushing and the bolt is also filled with grease, as is the chamber containing the seal, namely in the area facing the lubrication gap. In such constructions the lubricant reservoir in the bolt proper is eliminated, so that the bolt can be a solid part without hollow portions.

OBJECTS OF THE INVENTION

It is the principle object of the invention to provide a sealing arrangement of the generic kind, wherein the action of the forces generated in the hinge is basically limited only to a connection between the bushing and the chain link.

It is a further object of the invention to provide a generic hinge having components assembled either into a unlubricated, seal-free arrangement or into a lubricated track chain provided with sealing arrangement.

SUMMARY OF THE INVENTION

In order to solve this problem, the invention proposes that the support element be formed as an integral part of the bushing ends and the lubricating gap be connected to the receiving space for the seals by lubricating grooves or channels, formed in the frontal surface of the shaped supporting element and/or in the bushing body, and/or lubrication passages or channels be provided, through which the lubrication gap is connected with the sealing space.

Due to this construction it is possible to arrange the seal directly between the bushing and the outer chain link, without having to provide an additional support ring and other comparable elements in the hinge space, which could cause frictional locking. In the actual embodiment of the invention the bushing are shaped at their ends, so that when the outer chain links are pressed to bolt size, a frictional connection depending on the amount of applied pressure can be achieved between the bushing and the outer chain link and between the outer chain link and the bushing a sealing space results, which insures the sealing of the hinge in this area due to a correspondingly designed seal. The sufficient supply of lubricant is achieved alternately or in combination by providing radial lubrication grooves on the frontal surfaces of the bushing projections or by providing lubrication passages or channels traversing the bushing body and through which the lubrication gap is connected with the sealing space.

The design of the seal itself has to be adjusted to the spatial realities and geometric proportions, whereby the sealing space between chain link and bushing has to be optimally used by the seal. By correspondingly adjusting the design of the seal to the labyrinth contact surface of the chain link, as well as to the corresponding partial cut of the bushing contact surface a complete and durable sealing can be insured. A round ring of elastic material has to be considered as the simplest solution for the seal, whereby other seal shapes and combinations of sealing materials (elastomer materials) are possible.

Preferably it is also provided that the frontal surface of the shaped support element be set at a right angle with respect to the bushing axis.

Furthermore it is preferred that the surface of the bushing located between the frontal surface of the shaped support element and the bushing shell be recessed with respect to the frontal surface, whereby the area of the outer chain link forming the hollow receiving the seal reaches in axial direction over the point where the outer shell of the bushing starts and the bushing is at least slightly overlapped with radial play by the hollow-containing link parts of the outer links.

Finally, it is preferred that the recess between the frontal surface and the bushing shell be of a stepless design.

Thereby the transition surface between the frontal surface and the bushing shell can be designed as an inclined surface or as a concavely or convexly curved surface.

A preferred arrangement is the one where the seals are vulcanized to the walls of the outer chain links or of the bushing forming their receiving space, whereby the seals are made completely or partially of vulcanizable material.

Due to this design it is possible to vulcanize the seal to the walling of the outer chain link or the bushing prior to the assembly of the individual components, so that a strong fastening is given prior to assembly, and in addition thereto the seal having only a surface acted upon by relative movement, includes the surface which rests against the other respective component. Preferably the arrangement is designed so that the seal is vulcanized to the walling of the outer chain link surrounding the receiving space.

A preferred further development consists in that the area of the chain link forming the hollow in which the seal is received extends in radial direction only as far as necessary to create a motion clearance (gap) between the cylindric shell area of the bushing overlapped by it and the overlapping walling area of the chain link.

In the design according to the invention it is possible to introduce identical components with identical dimensions, independently of the fact whether later a lubricated chain with sealing arrangements or an unlubricated chain without sealing arrangements is supposed to be formed later out of these components. Basically this arrangement makes also possible to use components up to now normally used for unlubricated chains also for lubricated chains, whereby only corresponding work of the bushing part at its frontal surface has to be done, any other work becoming superfluous.

BRIEF DESCRIPTION OF THE DRAWING

The above and other objects, features, and advantages will become more readily apparent from the following description, reference being made to the accompanying drawing in which:

As seen in FIG. 1 the hinge includes two outer chain links 1, two inner chain links 2, a bolt 3 and a bushing 4. The outer chain links 1 are connected with bolt 3, for instance, in the manner of a slip-joint connection, while the inner chain links 2 are connected with the bushing 4. The bolt 3 has a bore 5 unilaterally open to the outside, which serves as a lubricant reservoir. The bore 5 is connected over a cross-channel 6 with a gap 7 between the bushing 4 and the bolt 3, which gap is in turn connected with the sealing arrangement 8 arranged in a hollow space of the outer chain links 1. The seals prevent the escape of the lubricant towards the outside. Between each end of the bushing 4 and each outer chain link 1, a dimensionally stable shaped support element 20 (FIG. 1) is formed integrally on the bushing ends as seen in FIGS. 1 and 2 or mounted on the support surface of the bushing ends as shown in FIGS. 5 and 6, which is shaped in one piece at the bushing end. Thereby the lubrication gap 7 is connected with the space 10 receiving the seal over lubrication grooves 30 (FIG. 7) or lubrication channels 11 shown in FIGS. 1 and 5. The lubrication grooves are arranged optionally radially on the frontal surface of the frontal surface of the support element 9, while the lubrication while passages traverse the bushing body and make the connection between the lubrication gap 7 and the hollow space 10. In all embodiment examples, the frontal surface of the shaped support element 9, 29, 39, 48, 60 and 40 is set at a right angle with respect to the bushing axis, i.e. parallel to the surface of the hollow space 10 of the outer chain link 1 which is oriented at a right angle with respect to the bushing axis. Also in all embodiment examples, the bushing surface located between the frontal surface of the support element 9 (FIG. 1) and the outer shell of the bushing 4 is recessed with respect to the frontal surface of the support element 9, whereby the area of the outer chain links 1 forming the hollow space 10 receiving the seal reaches in axial direction over the starting point of the outer shell of bushing 4, whereby the bushing is at least slightly overlapped with radial play by the link parts of the outer chain links 1 containing the hollow space 10. In this way no radial access gap to the hollow spaces 10 is formed, so that the penetration of dirt or the like in the hollow space 10 is made more difficult or even prevented to a large extent.

While in the embodiment example according to FIG. 3 the recess between the frontal surface 39 of the support element 9 and the bushing shell of bushing 4 is designed like a step, in the other embodiment shown in FIG. 2 the recess is stepless, namely as shown to the left in FIG. 2 in which the support surface is formed as an inclined surface 33. FIGS. 1 and 4 show the support surface formed as concave and convex surface respectively. FIG. 1 in the lower right side as a convex surface. The shape of seals 8 can also be selected at will, as well as the option to make the seals of a homogeneous elastomer material or of a composite elastomer material. Thus, for example, FIG. 2 illustrates an O-shaped seal 34, while as seen in FIG. 3, the seal 34' has a dome-shaped apart reaching radially outwardly with respect to a bolt axis A.

Preferably the seals are vulcanized to the wallings of the outer chain link defining the receiving space 10, whereby the seals are made completely or at least partially of a vulcanizable material. The sealing arrangement of the invention offers the possibility to use the usual components heretofore used for the production of unlubricated chains. In this arrangement the area forming the seal receiving space 10 of the outer chain link 1 extends in radial direction only so much as to allow a motion clearance (gap) between the cylindric outer shell area of bushing 4 which is overlapped by it and the overlapping walling portion of the chain link 1.

Figure 1:
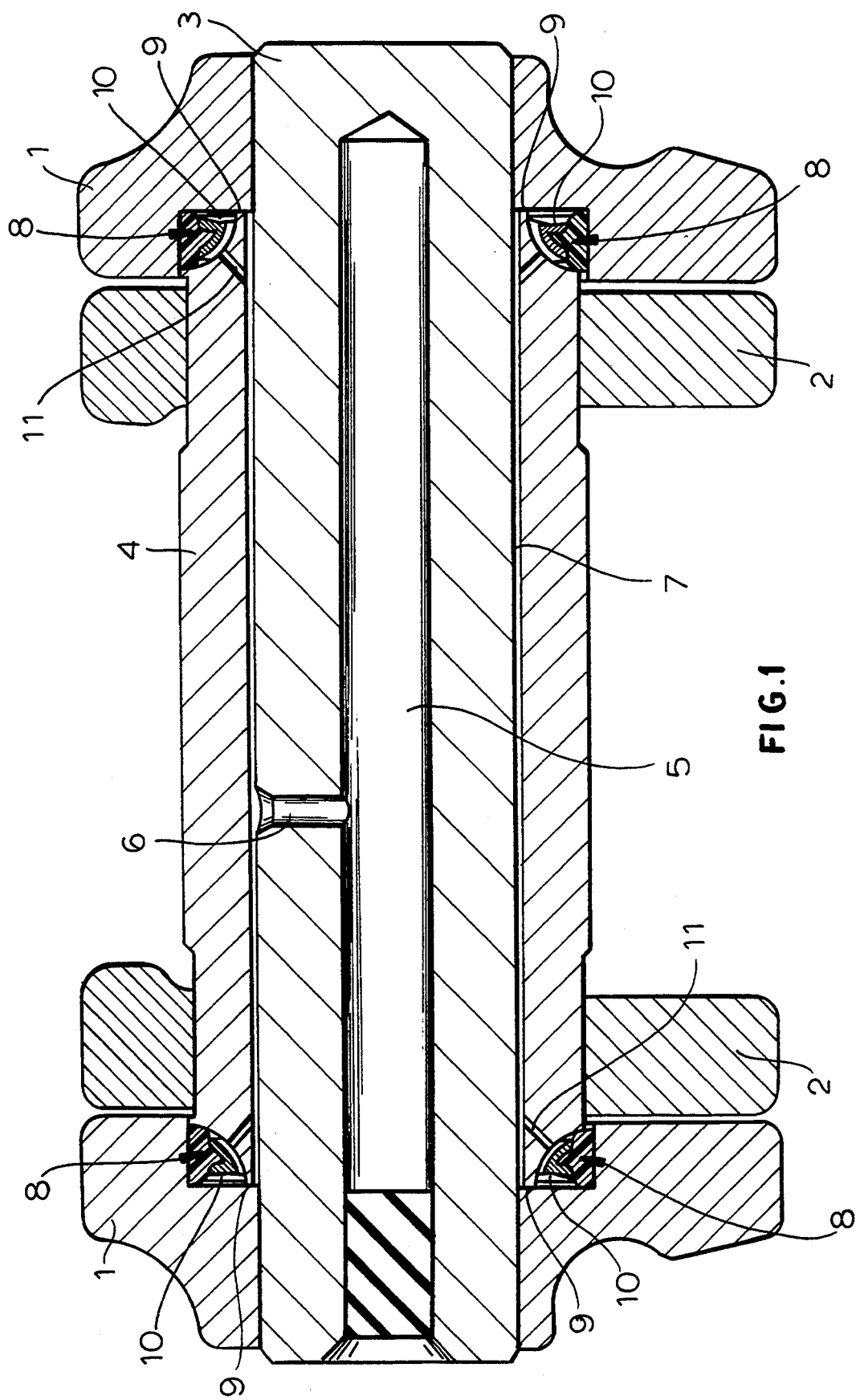
FIG. 1 is a diagrammatic sectional view along the axis of a hinge of a track chain with sealing arrangement.
Figure 2:
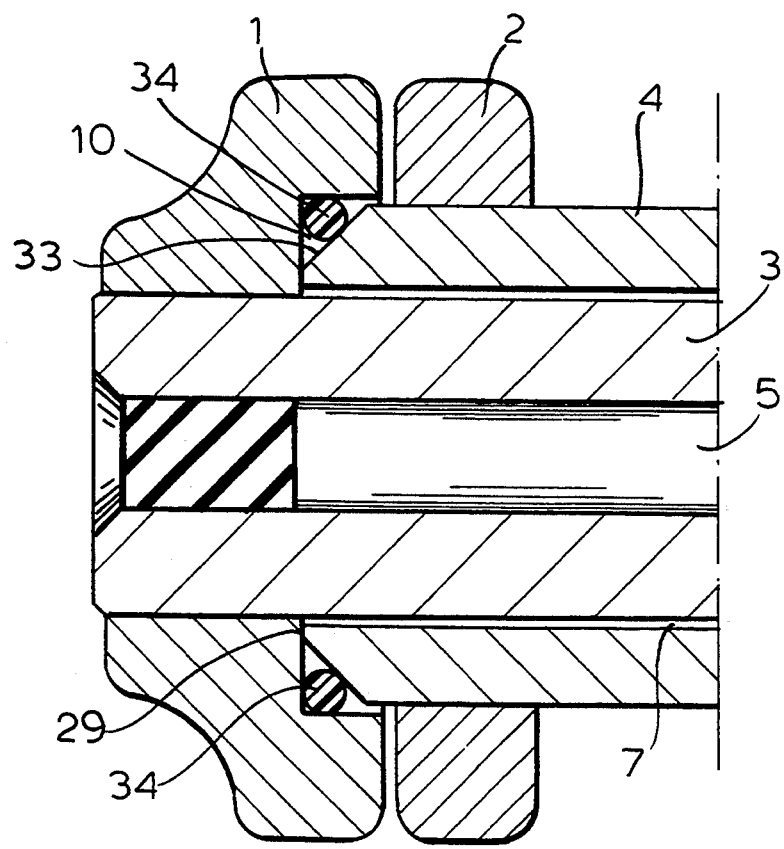
FIG. 2 is a partial axial sectional view of one embodiment of the sealing arrangement according to the invention.
Figure 3:
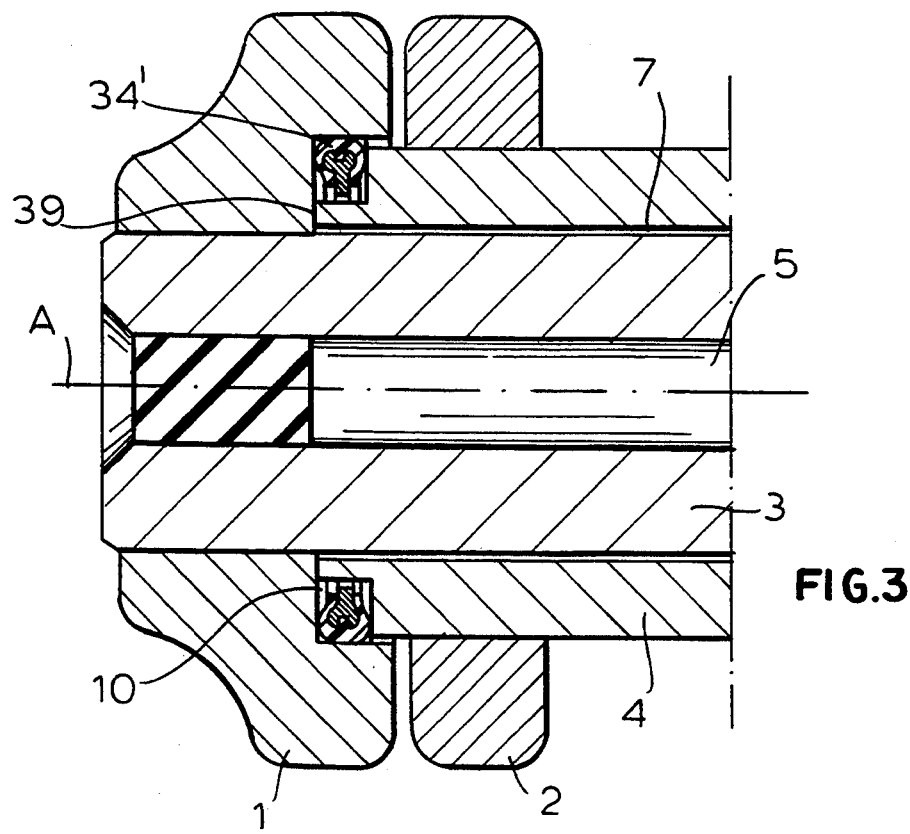
FIG. 3 is partial sectional axial view of another embodiment according to the invention.
Figure 4:
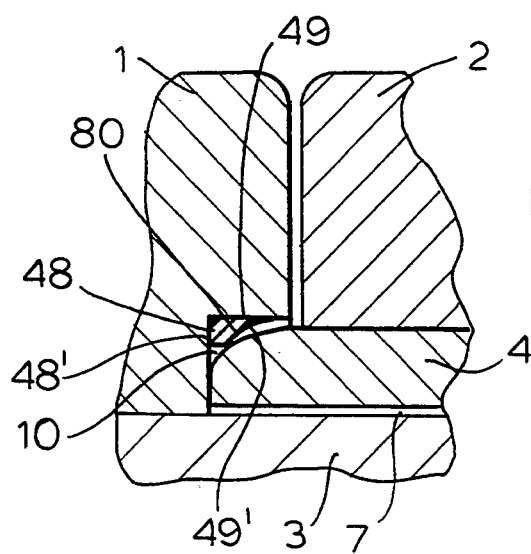
FIG. 4 is an enlarged sectional view of another embodiment of the sealing arrangement with a convex support surface of the bushing according to the invention.
Figure 5:
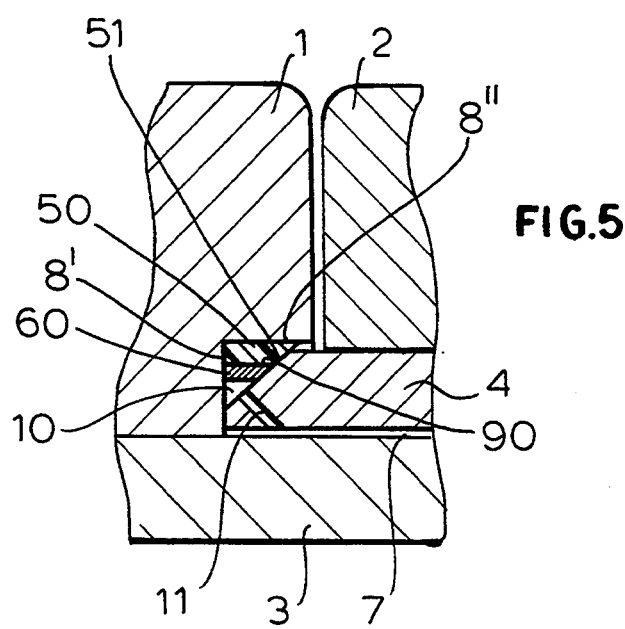
FIG. 5 is still another embodiment of the sealing arrangement including the tapered support surface of the bushing and support elements formed on the bushing.
Figure 6:
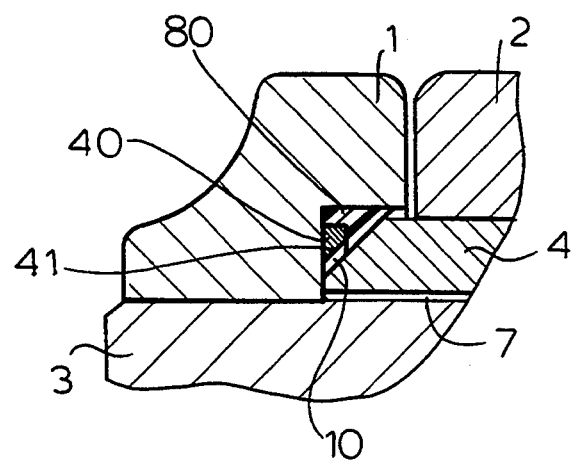
FIG. 6 is yet further embodiment of the sealing arrangement according to the invention similar to the one shown in FIG. 5 but having a different cross-section of the seal.

FIG. 4 shows an embodiment of the sealing arrangement with the support surface 80 which, in this case, is the bushing axial ends curved radially. The seal 48 has an inner surface 49 formed complementary with a respective support surface and an outer surface 48' and 49' registering respectively with radial and axial walls of the chain link 1. The support surface, the seal and the walling of the chain link form the respective space 10 communicating with the annular gap.

I claim:

1. Track chain hinge assembly comprising:
   a bolt extending along an axis;
   means forming a lubricant reservoir in the bolt;
   a bushing coaxial with the bolt and mounted pivotally thereon, the bushing being formed with opposite ends and with an inner peripheral recess for providing between the bushing and the bolt an elongated annular gap extending between the ends;
   flow means for providing a flow communication between the reservoir and the gap;
   a pair of axially spaced apart inner chain links mounted on the bushing;
   a pair of axially spaced apart outer chain links mounted on respective ends of the bolt and outwardly of said inner chain links and sealing the gap at the opposite ends;
   means forming a respective recessed portion in each of the outer links, each of the ends of the bushing being formed integrally with a respective support surface received in the respective recessed portion so as to form therewith a respective annular space;
   seal means in each annular space for compression in the axial and radial directions within each of the recessed portions upon application of thrust forces on the apparatus, the seal means partially filling the annular spaces to form respective annular compartments in each of the recessed portions; and
   means including a plurality of flow passages traversing the bushing and opening into the respective unfilled compartments for providing a flow communication between said gap and said unfilled compartments.

2. The assembly defined in claim 1 wherein each support surface extends in a plane perpendicular to said axis.

3. The assembly defined in claim 1 wherein each of said support surfaces extending axially inwardly to define a radial play between the respective outer link and the bushing.

4. The assembly defined in claim 1 wherein each of said support surfaces is stepless.

5. The assembly defined in claim 1 wherein the seal means is made at least partially of a vulcanizable material vulcanized to the bushing and a wall of said portion.

6. The assembly defined in claim 1, further comprising an annular support received in the space and in contact with the seal means.

* * * * *